Patented Jan. 1, 1929.

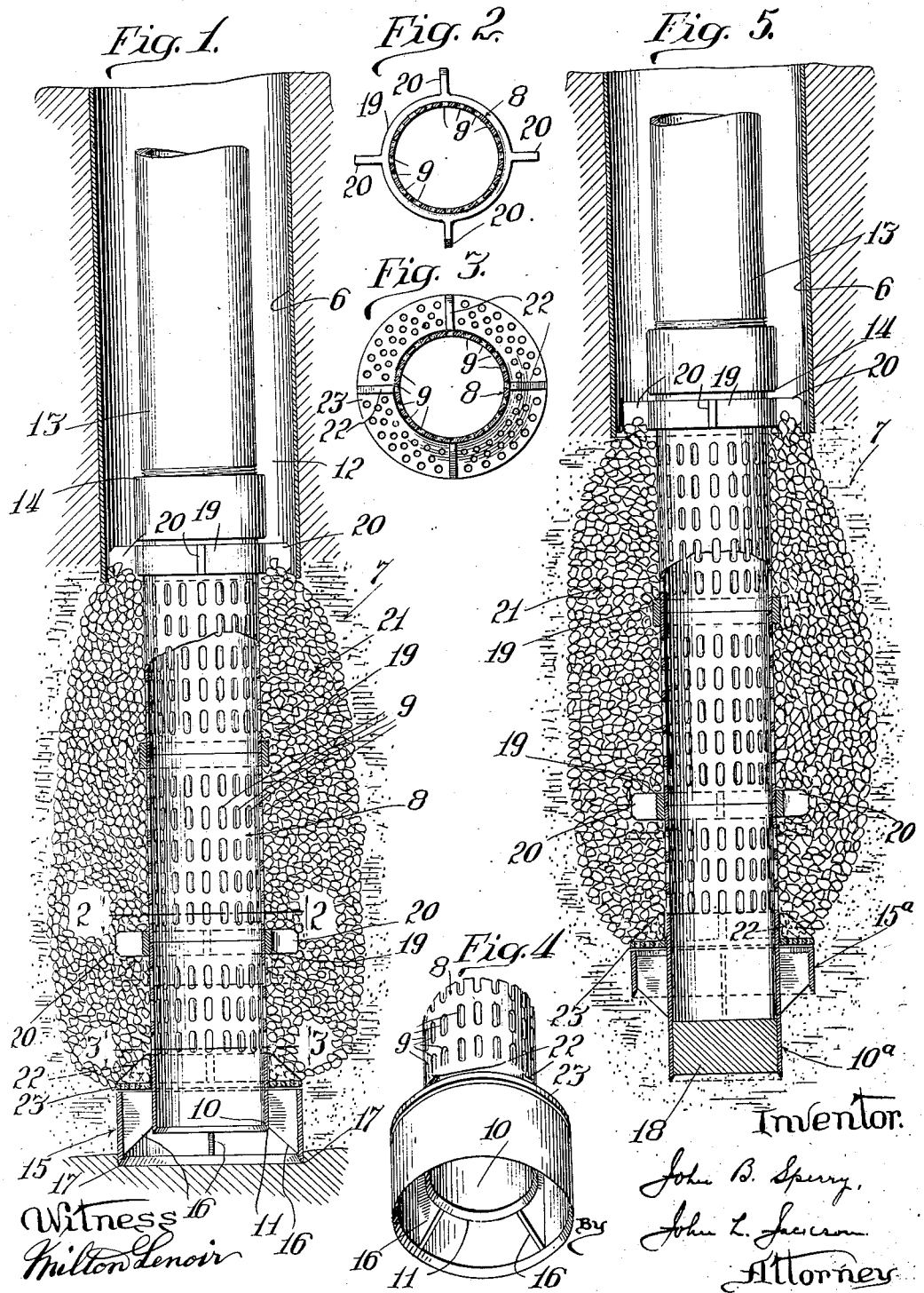

1,697,482

UNITED STATES PATENT OFFICE.

JOHN B. SPERRY, OF AURORA, ILLINOIS, ASSIGNOR TO AMERICAN WATER CORPORATION, OF AURORA, ILLINOIS, A CORPORATION OF ILLINOIS.

WELL APPARATUS.

Application filed December 20, 1926. Serial No. 155,797.

My invention has to do with sinking deep wells to obtain a water supply. Such wells usually comprise a well tube or casing which may serve merely as a retaining wall for the well, or may also be used to conduct the water to the surface. A screen, usually in the form of a cylindrical tube formed in one or more sections, and designed to prevent the passage of sand and other solid matter into the screen, connects at its upper end either with the well tube or with a conductor pipe that rises through the well tube to the surface. The lower end of the screen is embedded in hard pan, shale or rock, and is sealed with concrete so applied as to form a plug at its lower end and prevent water and sand from entering it at that point.

To facilitate the installation of the screen it is usually provided at its lower end with a strong shoe having a sharp cutting edge, so that it will cut through the strata of sand, clay or gravel under the weight of the screen and conductor pipe, to the lower end of which it is attached, the weight of such parts being supplemented when necessary by pressure applied by means of jacks attached to the top of the conductor pipe at the surface. During this operation the clay, or similar formation, penetrated is removed by a bailer or pump, which aids in sinking the screen down to its final position. During the operation of lowering the screen gravel is introduced through the well tube around the conductor pipe to form a coarse filter bed around the screen, which will prevent access of sand to the perforations of the screen and consequent clogging that would interfere with the free flow of water through the screen surface, and to better provide for the formation of such a filter bed is one of the objects of my present invention. Another of my objects is to provide a construction by which the screen may be lowered more expeditiously and with less effort, thereby reducing the cost of sinking the well. I accomplish these objects as illustrated in the drawings and as hereinafter described. What I regard as new is set forth in the claims.

In the accompanying drawings,—

Fig. 1 is a vertical sectional view of the lower portion of a well of the character referred to, showing the screen in its permanent position, but before the concrete plug is applied thereto;

Fig. 2 is a cross-section on line 2—2 of Fig. 1;

Fig. 3 is a cross-section on line 3—3 of Fig. 1;

Fig. 4 is a perspective view of the lower end portion of the screen, and the shoes carried by it; and Fig. 5 is a view similar to Fig. 1 showing a modified arrangement.

Referring to the drawings,—6 indicates the well tube or casing which, in the arrangement shown in Fig. 1, extends down to the upper part of the water bearing strata, indicated at 7. Disposed co-axially with the well tube 6 and extending down from a point slightly above the lower end thereof to hard pan or other impervious stratum, is a screen 8, which, in the illustration, is shown as a sheet metal tube provided with numerous slits or perforations 9, which may be made in any suitable way. At its lower end the screen 8 is provided with a shoe 10, preferably formed integral therewith, and having a sharp edge 11 at its lower end. This shoe is of the same, or approximately the same, diameter as the screen, which is of considerably less diameter than the well tube, so that an annular passage 12 is provided between the well tube and the outer surface of the screen, and that of the conductor pipe 13 by which the screen is lowered into the well. This conductor pipe is preferably of the same diameter as the screen, and is connected thereto by a screw-threaded coupling 14, so that, if desired, the conductor pipe may be withdrawn after the screen has been put in place.

In addition to the shoe 10, the screen is provided at its lower end with a second shoe 15 which is of greater diameter than the shoe 10 and preferably is of only slightly less diameter than the well tube 6. The shoe 15 is rigidly connected with the shoe 10 by a plurality of radial webs 16 arranged in spider-like form so that the shoe 15 is held firmly in co-axial relation with the shoe 10. The shoe 15 is also provided with a sharp cutting edge 17 at its lower margin, and, in the arrangement shown in Fig. 1, it extends down below the shoe 10. In the arrangement shown in Fig. 5 an outer shoe 15ª is provided that is similar in function to the shoe 15, but is located higher than the inner shoe 10ª so that the cutting edge of the latter is below that of the former. Where the arrangement shown in Fig. 5 is employed the lower end of the inner shoe 10ª is provided with a concrete plug 18, whereas in the construction shown in Fig. 1 the concrete plug, when one is used, is placed in the outer shoe 15 so that the cutting edge 11 of the inner shoe lies above it.

In lowering the screen into position it is desirable that it be held in axial alinement with the well tube as it descends so that the pumping mechanism usually placed in the screen to deliver water from the well will not be deflected laterally, which would be apt to cause binding because of the distortion of its connections, and thereby interfere with the proper operation of the pump. Also lateral deflection of the screen would interfere with the proper positioning of the gravel filter bed above referred to. To hold the screen in axial alinement with the well tube while it is being lowered, and also to diffuse or distribute the gravel, which, as will be hereinafter explained, is deposited around it, the screen is provided at suitable intervals with a series of couplings 19 which secure the sections of the screen together, said couplings being provided with outwardly extending arms or vanes 20 spaced apart around the periphery of the couplings. These vanes are long enough so that while they may descend freely through the well tube they prevent any considerable lateral deflection of the screen. One of the couplings 19 is placed near the upper end of the screen so that it remains in the lower end of the well tube after the screen has reached its permanent position, as illustrated in Fig. 1. The vanes 20 of consecutive couplings are disposed in staggered relation to each other, as indicated in Fig. 1, by which arrangement they better serve to distribute the gravel introduced to form the filter bed hereinafter referred to.

In lowering the screen its shoes 10, 15 cut through the material through which it is descending, which is principally sand or fine gravel, the outer shoe 15 cutting a bore of considerably greater diameter than the screen. The loosened material, part of which enters the screen directly, is removed by a bailer or sand pump as the screen descends, and the space left around the screen by the withdrawal of such material is filled in during the screen lowering operation by gravel introduced through the well tube around the conductor pipe 10, so that a gravel filter bed 21 is gradually formed around the screen. The distribution of the gravel uniformly around the screen is promoted by the staggered arrangement of the vanes 20, since the gravel in falling strikes such vanes and is deflected so that it piles up approximately uniformly around the screen.

It will be understood that inasmuch as the spaces between the webs 16 are open at the top as well as at the bottom, when the screen is being lowered the material loosened by the outer shoe 15 is free to pass down with the water between the two shoes and around the lower end of the inner shoe 10 into the screen under the action of the bailer or pump. Therefore, not only such material does not impede the descent of the screen, but also its removal provides more space for the reception of the gravel that forms the filter bed. The provision of the two shoes spaced apart and having a passage between them for the withdrawal of such material makes it possible to lower the screen with less effort, and at the same time provides for the formation of a better gravel filter bed. With this arrangement, however, it is necessary, or at least desirable, to provide means for preventing the gravel introduced to form the filter bed from entering the space between the two shoes, and thereby interfering with or preventing the removal of sand or other material that should be withdrawn before the screen reaches its final position. To this end I provide what may be termed a gravel valve which is best made in the form of a perforated radial flange or plate 23 mounted to slide longitudinally of the screen adjacent to its lower end, the diameter of which is substantially equal to that of the outer shoe 5 and provided with vertical ribs 22 which act as guides, so that said valve when in its lowermost position may rest upon and be supported by said shoe and will form a perforated closure for the upper end of the passage between the two shoes, as best shown in Fig. 1. When the screen is being lowered the gravel valve 23 will tend to rise upon the screen, under the resistance of the material that underlies it, but its upward movement is limited by one of the couplings 19 which is secured to the screen a comparatively short distance from its lower end. Gravel introduced while the gravel valve is in this position will to some extent be deposited upon the gravel valve 23, and ultimately, as the material below said valve is withdrawn, the valve will descend along the screen until it reaches the upper margin of the shoe 15, which, of course, arrests it. Until such time, however, the upper end of the passageway between the two shoes will be entirely open so that the material to be withdrawn that lies around the screen may pass freely into and through such passage and be discharged through the screen and conductor pipe. In the arrangement shown in Fig. 1, after the screen has reached its final position and the gravel valve rests on the shoe 15 and permits water that percolates through the gravel filter bed to pass into the lower end of the screen, as it is in effect a lateral extension of the screen. In the arrangement shown in Fig. 5, this latter function is not performed by the gravel valve since the lower end of the inner shoe is closed by the cement plug 18, but in other respects it operates in the same way as the construction shown in Fig. 1.

It will be seen from the foregoing that by the construction described I not only make it possible to lower the screen with less effort and more expeditiously, but also provide for establishing a comparatively uniform gravel filter bed of substantial dimensions around the screen, so that the water passing to the screening surface is practically free from sand or other solid matter.

What I claim as my invention and desire to secure by Letters Patent, is—

1. In a well apparatus, the combination with a tubular screen having a cutting member at its lower end portion, and a passage between said cutting member and the screen, of means movable with respect to said screen and said cutting member for closing said passage against the admission of gravel thereto.

2. In a well apparatus, the combination with a tubular screen having a cutting member at its lower end portion, and a passage between said cutting member and the screen, of a gravel valve movable with respect to said cutting member and along the screen for closing said passage against the admission of gravel thereto.

3. In a well apparatus, the combination with a tubular screen having a cutting edge at its lower end, of a cylindrical shoe, of greater diameter than said cutting edge, secured to the lower end portion of the screen and providing a passage, open at its upper end, between the screen and the shoe.

4. In a well apparatus, the combination with a tubular screen having a cutting edge at its lower end, of a cylindrical shoe, of greater diameter than said cutting edge, secured to the lower end portion of the screen and providing a passage, open at its upper end, between the screen and the shoe, and movable means for closing said passage against the admission of gravel thereto.

5. In a well apparatus, the combination with a tubular screen having inner and outer shoes at its lower end spaced apart to provide a passage between said shoes, of a gravel valve movable along the screen above said passage.

6. In a well apparatus, the combination with a tubular screen having inner and outer shoes at its lower end spaced apart to provide a passage between said shoes, of a gravel valve movable along the screen and adapted to be supported by said outer shoe over the upper end of said passage.

7. In a well apparatus, the combination with a tubular screen having a cutting edge at its lower end of a cylindrical shoe, of greater diameter than said cutting edge, secured to the lower end portion of the screen and providing a passage, open at its upper end, between the screen and the shoe, and a valve slidable along the screen above said passage, comprising a radial plate adapted to overlie the same.

8. In a well apparatus, the combination with a tubular screen having a cutting edge at its lower end, of a cylindrical shoe, of greater diameter than said cutting edge, secured to the lower end portion of the screen and providing a passage, open at its upper end, between the screen and the shoe, and a valve slidable along the screen above said passage, comprising a perforated radial plate adapted to overlie the same.

9. A tubular screen for wells comprising a perforated cylindrical member having outwardly extending vanes secured thereto at intervals along its length, and a cutting shoe of greater diameter than the screen, at the lower end thereof.

10. A tubular screen for wells comprising a perforated cylindrical member having outwardly extending vanes secured thereto at intervals along its length, said vanes being arranged in staggered relation to each other, and a cutting shoe of greater diameter than the screen, at the lower end thereof.

JOHN B. SPERRY.